April 23, 1963

E. SKIPOR ET AL 3,086,470

SYSTEM FOR INCREASING FLUID PRESSURE

Filed March 28, 1960

INVENTORS.
EUGEN SKIPOR
SERHIJ BACHYNSKYJ
By Harry H Hitzeman
ATTY

INVENTORS.
EUGEN SKIPOR
SERHIJ BACHYNSKYJ

United States Patent Office 3,086,470
Patented Apr. 23, 1963

3,086,470
SYSTEM FOR INCREASING FLUID PRESSURE
Eugen Skipor and Serhij Bachynskyj, Chicago, Ill., assignors of sixty percent to said Skipor, and forty percent to said Bachynskyj
Filed Mar. 28, 1960, Ser. No. 17,886
8 Claims. (Cl. 103—50)

Our invention relates to improvements in fluid flow devices.

Our invention relates more particularly to mechanism for utilizing the flow of fluid under a given pressure to deliver part of the fluid at an increased pressure and the balance at atmospheric pressure.

There are a great many instances where fluids such as water, oil or other liquid products may be received at a dispersing point under a given pressure. From this point it may be desirable to direct part of said fluid at a greater pressure and the balance at atmospheric pressure or permit flow by gravity to a tank or reservoir from which it may be pumped for later use.

Thus, the present invention relates to mechanism for increasing or multiplying the pressure of liquid in a system.

An object of the invention is to accomplish this by a combination of valves and connected pistons or diaphragms that are automatic in operation and will effect a pulsating action.

A further object of the invention is to provide a fluid circulating system of the type described which will be automatic in operation as long as liquid under pressure is being pumped into the system.

For a more comprehensive understanding of the invention and the attendant advantages thereof, reference is had to the accompanying drawings, upon which:

FIG. 1 is a generally diagrammatic cross-sectional view through a system embodying our invention;

FIG. 1-A is a cross-sectional view through one of the valve mechanisms which we employ, taken on the line 1A—1A of FIG. 1;

FIG. 1-B is a perspective view of the sliding valve shown in FIG. 1-A;

FIG. 1-C is a side elevational view of the vertical piston-controlled valve;

Figure 1:
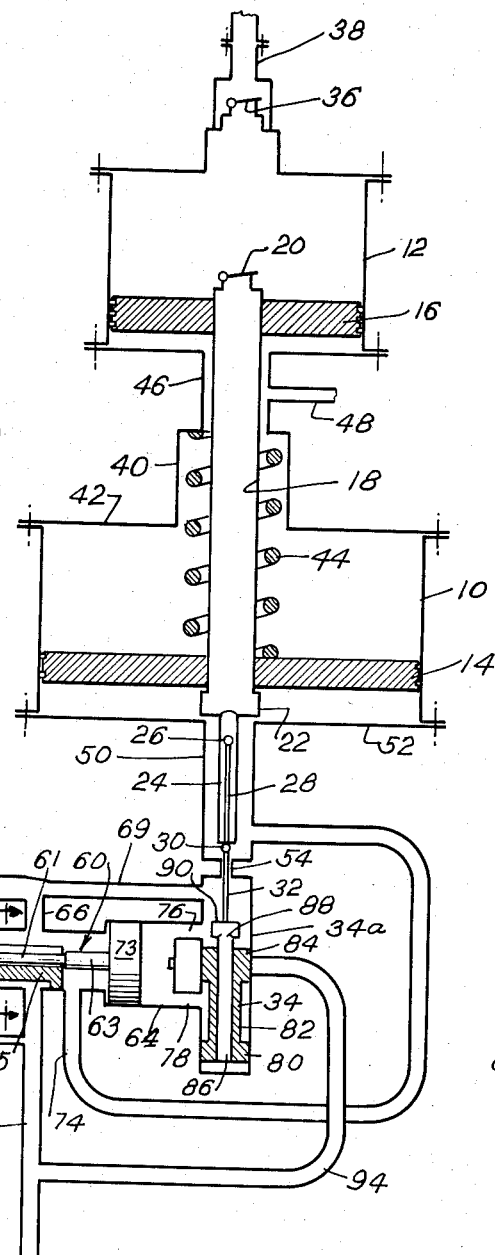

In the embodiment of the invention shown and which is generally diagrammatic for easier illustration, the system may generally include a pair of cylinders 10 and 12, the cylinder 10 being approximately twice the area size of the cylinder 12, and each of the cylinders having a movable piston therein, the piston 14 in the cylinder 10 and the piston 16 in the cylinder 12. The pistons 14 and 16 are connected together by a tubular connecting rod 18 which has a one-way valve 20 at the upper end and a cross tube 22 at the lower end, the cross tube 22 also having a downwardly extending tubular rod 24 within which one head 26 of a timing rod 28 is located, the rod extending through an opening in the lower end of the rod 24 and having a second head 30 therebelow, the head 30 being united by a connecting rod 32 to a valve unit 34.

The small cylinder 12 may have a one-way check valve 36 in its upper end leading to a discharge conduit 38 for high pressure fluid. The cylinder 10 may have a raised pocket 40 above the top 42 of the same for two purposes, to receive a compression spring 44 positioned above the piston 14 and to provide a space for the connecting rod 18 to the interior of the cylinder 12 below the piston 16. A reduced vent 48 may connect with the space 46 to permit flow of atmospheric pressure to the cylinders below the pistons 16 and above 14.

The tubular rod 24 may be located in an enlarged passageway 50 connected at its upper end to the bottom 52 of the cylinder 10 and having a reduced passageway 54 with a liquid seal through its lower end for the rod 32.

In the operation of the system herein described, two moving valves are required, a valve 60, as shown in FIG. 1-B, and a valve 34 as shown in FIG. 1-C. The valve 60 may be mounted for reciprocal movement in a housing 64 which has an inlet conduit 66 from a passageway P for fluid under pressure. The housing 64 may have a reduced passageway 70 extending downwardly from the front end of the same into a discharge conduit 72 to atmospheric pressure, a second discharge passageway 74 forward of the inlet passageway 66, and a pair of end passageways 76 and 78 which communicate with the housing 34a for the valve 34.

The valve 60 may have a reduced stem portion 61 positioned between the two shoulder portions 63 that engage a sliding block 65 secured therebetween. The block 65 has a chamber 68 in the lower side of the same which, in its movement back and forth, will connect the discharge pipe 72 and the passageway 74, as will presently be apparent. The valve 60 also has an enlarged head portion 71 in the forward end of housing 64 and a larger end portion 73 in the opposite end of the housing 64.

The valve 60 is generally adapted to move back and forth in the housing 64 as described, the housing being in the form of three end-to-end reduced cylindrical chambers with the valve block 65 moving in the central chamber, the disc 71 in the smallest chamber, and the disc 73 in the largest chamber.

The valve 34, as previously described, is in effect a reversing valve and will cause the return of the pistons and other mechanism to normal position, as will presently be described. This valve is a sliding valve element having an end shoulder 80, a reduced body portoin 82 and a second enlarged shoulder 84. The valve also has a medial bore 86 throughout its length, and has a pipe 88 fastened in said bore, the pipe having a T-member 90 in its upper end, and the stem 32 of the reversing valve being connected in the upper end of the T.

In the initial state of operation as shown in FIG. 1, the valve is adjacent the lower end of the valve housing 34a and under pressure of spring 44, and a by-pass 94 between the housing 34a and the discharge pipe 72 is normally shut off. The discharge pipe 74 extends from the housing 64 around the valve 34 to the passageway 50 leading to the lower end of the cylinder 10. The inlet conduit P, as previously mentioned has a passageway 66 leading to the housing 64 and a second passageway 69 leading to the top of housing 34a.

The operation of the mechanism hereinbefore described will now be explained. With the valves and pistons in the normal or starting position, as shown in FIG. 1, when water or other liquid is pumped into the intake line P under, for example, a pressure of 20 lbs. per square inch, the upper part of housing 34a will be filled with liquid under pressure, the housing 64 back of the valve disc 73, and in the housing 64 there will be equal pressure throughout against the disc 73. There will also be 20 lbs. pressure in the line 74 to the housing 50 and into the lower end of the cylinder 10, also up through the hollow connecting rod 18 to the check valve 20.

Figure 2:
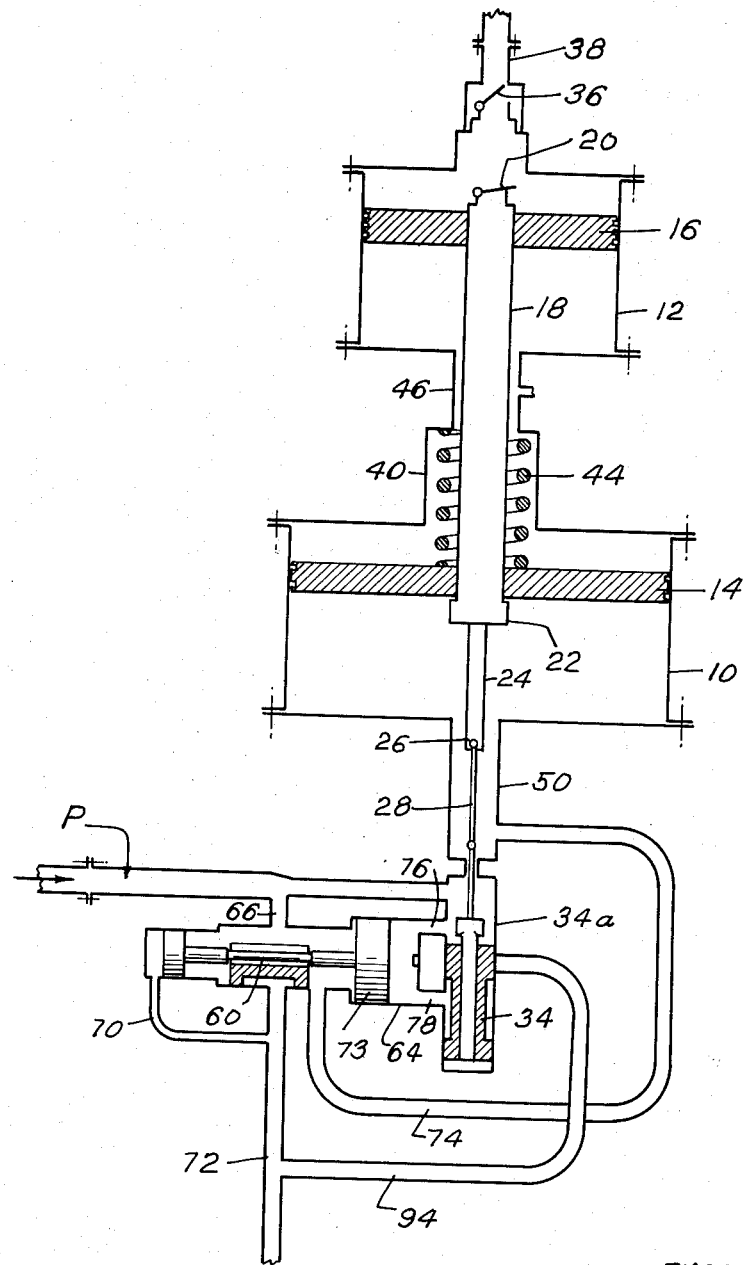
FIG. 2 is a view similar to FIG. 1 but in a changed position, showing the pistons in the system moving upward in a discharge action and causing a refilling of the larger cylinder below its piston.
Figure 3:
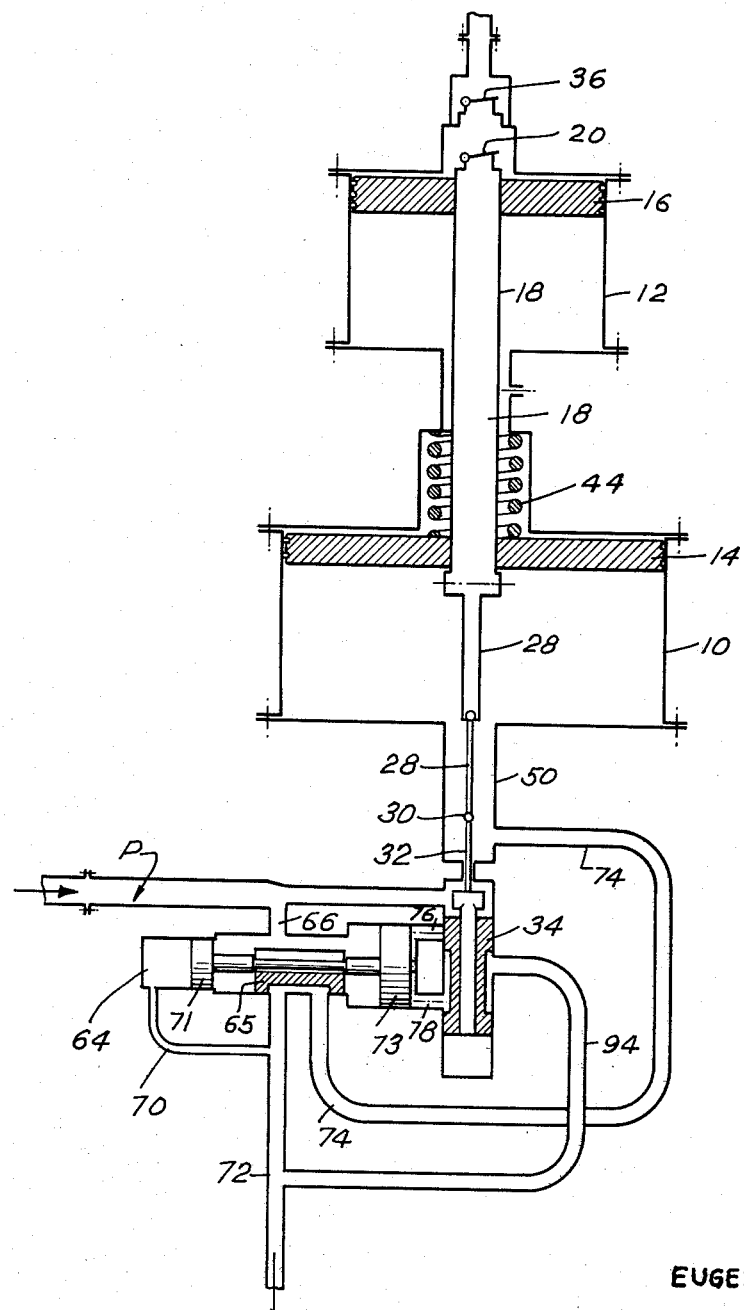
FIG. 3 is a changed position view, being at the top end of the stroke of the two aligned pistons, wherein the upper portion of one cylinder has been exhausted.

After this condition has been reached, FIG. 2 illustrates the next step in the operation, the passageways 72 and 94 being open to atmospheric pressure. As the piston 14 rises in the cylinder 10 under the 20 lb. per square inch pressure, the cylinder 12 will be discharged through the check valve 36 and passageway 38, leaving the lower end of cylinder 12 empty. During this condition no changes take place until the piston 14 has almost reached the top of cylinder 10, at which time the hollow connecting rod 24 will engage the ball 26 and commence to pull the valve member 34 upwardly to the position of the parts shown in FIG. 3. This is the extreme upward position of the pistons 14 and 16 and in this position the valve 34 will have been raised and connecting housing 64 from right side of valve disc 73 to atmospheric pressure through passageway 78, discharge 94 and 72, the valve 60 being under pressure (20 p.s.i.) from the left side of the valve disc 73 to move it to the right end position. This moves the block valve 65 to the right and connects the discharge passage 72 with the passage 74, releasing pressure on the bottom of cylinder 14 by permitting a discharge of the fluid through the housing 50, passage 74, block 65 and discharge pipe 72.

In this position the coiled spring 44 which has now been loaded, starts to push the piston 14 down, permitting fluid in the cylinder 10 to flow upwardly through the hollow connecting rod 18 into the cylinder 12 above the piston 16 so that this cylinder is filled with liquid as the pistons are receding or dropping to their lowermost position. Since the discharge of the liquid in the system below the pistons is now directed through the discharge 74 and 72 to a reservoir or other atmospheric pressure destination, nothing will prevent the action of the coiled spring 44.

Figure 4:
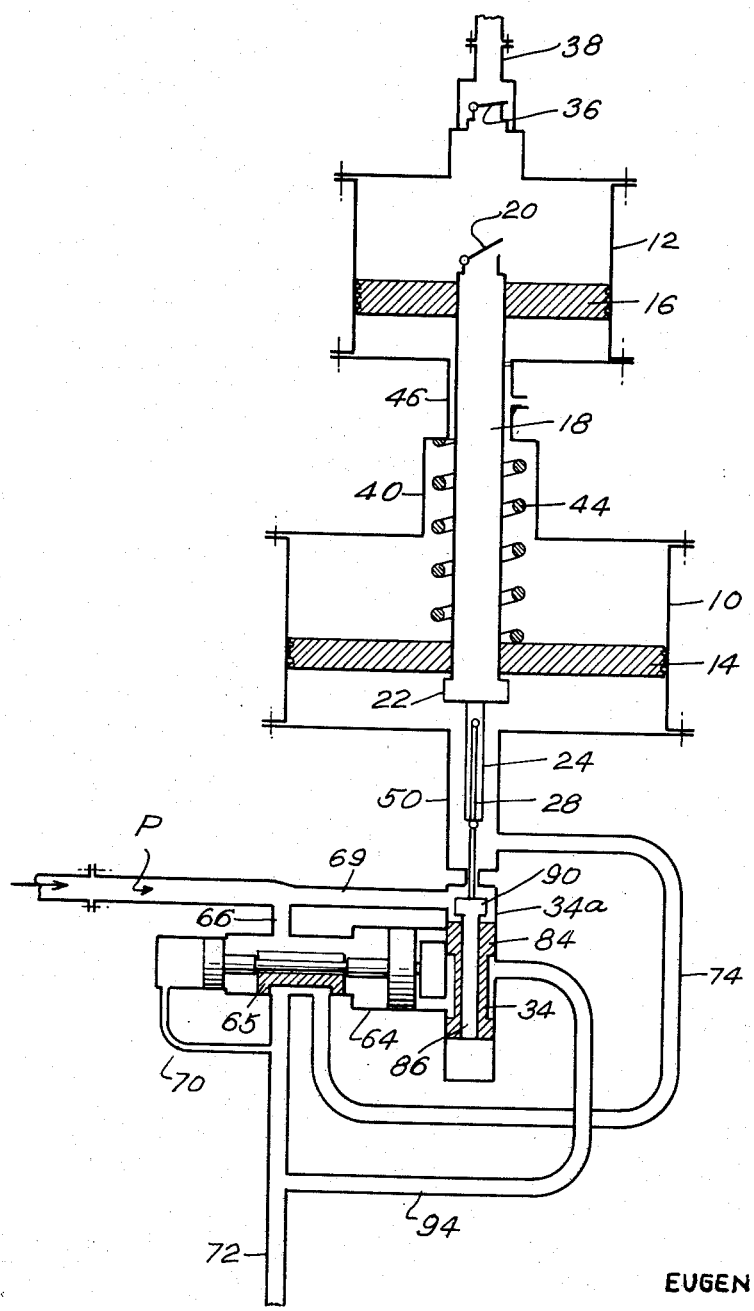
FIG. 4 is a changed position view showing the pistons descending under the action of the compression spring in the unit and refilling the upper cylinder.

When the cylinder 12 is almost completely filled, and the pistons 14 and 16 are moving back down to the original position shown in FIG. 4, the lower end of the valve control rod 24 will bear on the ball 30 on the stem 28 and push the valve 34 down in the valve housing 34a to the position shown in FIG. 1. When this is done, flow of fluid under pressure will again enter the right side of housing 64 beyond the disc 73 through the passageway 76 and push the same to the left, including the block valve 65, thus cutting off return flow through passage 74 to the discharge passage 72, and commencing again the building up of pressure under the piston 14 to raise the same and at the same time force fluid out under pressure from the cylinder 12.

Since the cylinder 12 is about one-half the area size of the cylinder 10, this will in effect increase or multiply the pressure under which the fluid is being forced out to approximately double that of the original intake.

From the above and foregoing description, it can be seen that we have provided by the use of a pair of multiple valve members, a system within which fluid under a fixed pressure may be pumped in and in effect pumped out in a pulsating action at a higher pressure. In the present instance, where the area ratio of the pistons in the cylinders 10 and 12 is approximately 2 to 1, the pressure should be increased from 20 lbs. per inch to approximately 40 lbs. per inch.

Figure 5:
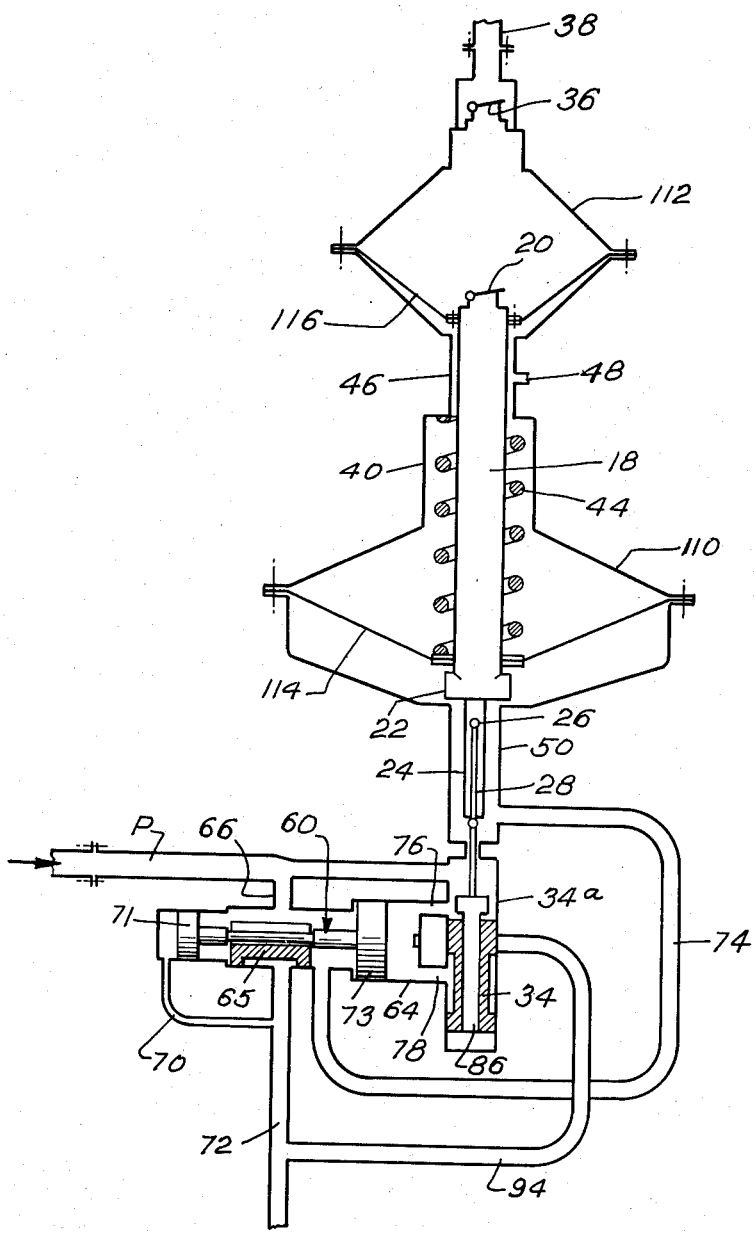
FIG. 5 is a generally diagrammatic view of a modified system.

While the invention has thus far been described in connection with multiple pistons, it can be seen that a diaphragm action is possible with similar results. For example, in FIG. 5 we have shown diaphragm housings 110 and 112 having the diaphragms 114 and 116 therein, the diaphragms being connected to the hollow connecting rod 18 in the same manner that the pistons 14 and 16 have been connected. All the other elements in the system will be identical with those shown in FIGS. 1–4, the purpose of the showing being simply to explain how a diaphragm action may also be embodied in a similar system.

While we have illustrated and described a specific embodiment of the invention, it will be apparent to those skilled in the art that changes and modifications may be made in the exact details shown, and we do not wish to be limited in any particular; rather what we desire to secure and protect by Letters Patent of the United States is:

1. In a system for increasing fluid pressure the combination including, an inlet conduit for a source of liquid under pressure, a first valve housing and a second valve housing, said inlet conduit being connected to said valve housings, a slide valve assembly in said first valve housing, a slide valve in said second valve housing, a lower cylinder and an upper cylinder positioned in axial alignment, said lower cylinder being of greater diameter than said upper cylinder, pistons slidably arranged in each of said cylinders, a hollow rod connecting said cylinder pistons whereby liquid may flow from the underside of said lower cylinder piston through said hollow rod to the top side of said upper cylinder piston, a first check valve arranged to allow one way flow of liquid from the lower cylinder to the upper cylinder and a second check valve arranged to allow one way flow of liquid from out of the upper cylinder, a valve lifting means connecting said hollow rod to the slide valve of said second valve housings, and conduit means arranged so that liquid will flow from said inlet conduit through the first valve housing into the lower cylinder when the slide valves are in a first position and will flow from the lower cylinder through the first valve housing to exhaust when the slide valves are in a second position.

2. In a system for increasing fluid pressure according to claim 1, whereby in said first position the slide valve in said second valve housing is adapted to expose the end of the slide valve assembly in said first valve housing to the liquid in the inlet conduit to maintain the slide valve assembly of the first valve housing so that the liquid will flow through the first valve housing into the conduit leading to the underside of the lower cylinder piston.

3. In a system for increasing fluid pressure according to claim 2, whereby in said second position the slide valve in said second valve housing will shut off exposure of the end of the slide valve assembly in said first valve housing to the liquid in the inlet conduit whereby the slide valve assembly of the first valve housing will move under liquid pressure so that liquid will flow from the lower cylinder into the conduit means and through the first valve housing to exhaust.

4. In a system for increasing fluid pressure according to claim 3, wherein said valve lifting means is arranged to move the slide valve in the second housing from first to second position.

5. In a system for increasing fluid pressure according to claim 4, wherein said first check valve means is associated with said hollow rod.

6. In a system for increasing fluid pressure according to claim 5, wherein said second check valve is arranged in a discharge conduit associated with the upper cylinder.

7. In a system for increasing fluid pressure according to claim 6, wherein resilient means are arranged to resist movement of the piston in the lower cylinder in the direction of the upper cylinder.

8. In a system for increasing fluid pressure according to claim 3, wherein the slide valve assembly of the first valve housing includes a sliding block and a valve having head portions of unequal diameter, which valve engages said sliding block.

References Cited in the file of this patent

UNITED STATES PATENTS

| | | |
|---|---|---|
| 38,531 | Coates et al. | May 12, 1863 |
| 120,841 | Wheeler | Nov. 14, 1871 |
| 157,617 | Loretz | Dec. 8, 1874 |

(Other references on following page)

UNITED STATES PATENTS

| | | |
|---|---|---|
| 1,377,585 | Johanson | May 10, 1921 |
| 2,080,695 | Cargile | May 18, 1937 |
| 2,188,646 | Bunch | Jan. 30, 1940 |
| 2,765,804 | Dinkelkamp | Oct. 9, 1956 |
| 2,896,542 | Forghieri | July 28, 1959 |

FOREIGN PATENTS

| | | |
|---|---|---|
| 120,622 | Great Britain | of 1918 |
| 204,076 | Germany | Dec. 14, 1906 |
| 246,481 | Italy | Mar. 25, 1926 |
| 436,653 | France | Jan. 29, 1912 |
| 983,664 | France | Feb. 14, 1951 |
| 1,217,785 | France | Dec. 14, 1959 |